US009638865B2

(12) United States Patent
Hasegawa et al.

(10) Patent No.: US 9,638,865 B2
(45) Date of Patent: May 2, 2017

(54) SWITCH DEVICE

(71) Applicant: FURUKAWA ELECTRIC CO., LTD., Tokyo (JP)

(72) Inventors: Junichi Hasegawa, Tokyo (JP); Kazutaka Nara, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/092,170

(22) Filed: Apr. 6, 2016

(65) Prior Publication Data

US 2016/0216451 A1 Jul. 28, 2016

Related U.S. Application Data

(63) Continuation of application No. PCT/JP2014/005030, filed on Oct. 2, 2014.

(30) Foreign Application Priority Data

Oct. 9, 2013 (JP) ................................. 2013-211671

(51) Int. Cl.
*G02B 6/35* (2006.01)
*H04J 14/02* (2006.01)
*H04Q 11/00* (2006.01)
*G02F 1/313* (2006.01)
*G02B 6/293* (2006.01)

(52) U.S. Cl.
CPC ....... *G02B 6/3544* (2013.01); *G02B 6/29383* (2013.01); *G02F 1/3136* (2013.01);
(Continued)

(58) Field of Classification Search
None
See application file for complete search history.

(56) References Cited

U.S. PATENT DOCUMENTS

2007/0196106 A1* 8/2007 Eiselt .................. H04J 14/0204
398/43
2014/0270634 A1* 9/2014 Miller ................ H04Q 11/0005
385/16
(Continued)

FOREIGN PATENT DOCUMENTS

JP 2009-134192 6/2009
JP 2011-40997 2/2011
(Continued)

OTHER PUBLICATIONS

International Search Report issued Jan. 6, 2015 in PCT/JP2014/005030 filed Oct. 2, 2014 (with English translation).
(Continued)

*Primary Examiner* — Mike Stahl
(74) *Attorney, Agent, or Firm* — Oblon, McClelland, Maier & Neustadt, L.L.P.

(57) ABSTRACT

The present invention provides a switch device for an optical signal which has high extendibility and which can suppress an increase of loss in extension. A switch device in one embodiment of the present invention includes, in a housing, four splitter portions, four switch portions, and extension splitter portions. The splitter portions are connected to path-side ports, the switch portions are connected to client-side ports, and the splitter portions and the switch portions are connected to one another via shuffle fiber arrays. One ends of the extension splitter portions are connected to path-side extension ports, and the other ends thereof are connected to client-side extension ports. The number of wavelengths processable by the switch device can be easily changed by changing a connection state of optical fibers to the path-side ports, the client-side ports, the path-side extension ports, and the client-side extension ports.

8 Claims, 11 Drawing Sheets

(52) U.S. Cl.
CPC ...... *H04J 14/0219* (2013.01); *H04Q 11/0001* (2013.01); *G02B 6/356* (2013.01)

(56) References Cited

U.S. PATENT DOCUMENTS

| | | | | |
|---|---|---|---|---|
| 2015/0055952 A1* | 2/2015 | Younce | ............... | H04J 14/0212 398/48 |
| 2016/0025930 A1* | 1/2016 | Hasegawa | ............. | G02F 1/3137 385/17 |

FOREIGN PATENT DOCUMENTS

| | | |
|---|---|---|
| WO | WO 2014/049942 A1 | 4/2014 |
| WO | WO 2014/167800 A1 | 10/2014 |
| WO | WO 2014/171083 A1 | 10/2014 |

OTHER PUBLICATIONS

Written Opinion issued Jan. 6, 2015 in PCT/JP2014/005030 filed Oct. 2, 2014.

Toshio Watanabe, et al., "Compact PLC-based Transponder Aggregator for Colorless and Directionless ROADM", Optical Society of America/OFC/NFOEC2011, 2011, 2 pgs.

Atsushi Watanabe, et al., "Optical Path Cross-Connect System Architecture Suitable for Large Scale Expansion", Journal of Lightwave Technology, vol. 14, (10), 1996, 6 pgs.

Takeshi Seki, et al., "Experimental Demonstration of Colorless and Directionless Optical Cross*Connect by using 3D-MEMS Optical Switch and WSS", Nen IEICE Communications Society Conference, 2009, 1 pg.

\* cited by examiner

SWITCH DEVICE

CROSS-REFERENCES TO RELATED APPLICATIONS

This application is a continuation application of International Application No. PCT/JP2014/005030, filed Oct. 2, 2014, which claims the benefit of Japanese Patent Application No. 2013-211671, filed Oct. 9, 2013. The contents of the aforementioned applications are incorporated herein by reference in their entireties.

TECHNICAL FIELD

The present invention relates to a switch device for an optical signal, and particularly to a switch device used for adding and dropping of an optical signal in wavelength multiplexing transmission.

BACKGROUND ART

In the recent years, ROADM (Reconfigurable Optical Add/Drop Multiplexer) techniques have been devised to increase the speed and capacity of optical communication. In an optical network using the ROADM, a wavelength multiplexing transmission method is used, and an optical signal of any wavelength can be added and dropped without being converted to an electric signal. Moreover, in the optical network using the ROADM, when a route through which an optical signal of each wavelength is to be transmitted is desired to be changed (newly added or disused), the route can be changed, i.e. reconfigured without performing work such as connection work (Reconfigurable).

In order to achieve the ROADM, there is required a switch device (also called multicast switch) which is provided between the ROADM network and a client device and which is capable of receiving and outputting multiple wavelengths and changing routes. Specifically, the switch device used in the ROADM has a function of receiving an input of an optical signal from the client device and adding the optical signal to a path of the ROADM network (hereafter, also referred to as Add function) and a function of outputting an optical signal dropped from a path of the ROADM network to the client device (hereafter, also referred to as Drop function), and is capable of dynamically changing the route through which the optical signal is transmitted. In this specification, the number of paths of the ROADM network to which the switch device is connectable is referred to as the number of paths, and the number of client devices to which the switch device is connectable is referred to as the number of wavelengths. Moreover, a series of routes (including waveguides and optical fibers) through which an optical signal inputted to or outputted from each path is transmitted is referred to as a channel.

FIG. 18 is a top view of an example of a switch device (multicast switch) 900 which has a dual configuration (i.e. a configuration with the Drop function and the Add function) and in which the number of paths is 8 and the number of wavelength is 16. The switch device 900 includes two splitter portions 920 and eight switch portions 930 in a housing 960. Each of the splitter portions 920 has a predetermined number of optical splitters, and each of the switch portions 930 has a predetermined number of optical switches. One ends of the splitter portions 920 are connected to the ROADM network via network-side fibers 940, and other ends thereof are branched and connected to one ends of the switch portions 930. Furthermore, other ends of the switch portions 930 are connected to the client devices via client-side fibers 950. The splitter portions 920 are connected to the switch portions 930 by a not-illustrated shuffle fiber array including multiple optical fibers which are three-dimensionally arranged. Such a configuration enables the switch device 900 to add and drop optical signals between the ROADM network and the client devices.

The switch device 900 is designed to process a predetermined number of wavelengths and a predetermined number of paths. Accordingly, in the case of changing the number of processable paths or wavelengths, the entire housing 960 needs to be replaced. In other words, the switch device 900 has poor extensibility and versatility, and requires huge cost to change the number of processable paths or wavelengths.

A configuration like that of a wavelength selective optical switch in Patent Document 1 can be employed to secure extensibility. Note that the wavelength selective optical switch in Patent Document 1 has a configuration similar to the multicast switch in the present invention, but is not a multicast switch. This is because a route through which an optical signal of each wavelength is to be transmitted is fixed in the wavelength selective optical switch, while a route for an optical signal of each wavelength is changeable in a multicast switch. The wavelength selective optical switch in Patent Document 1 includes a base unit and an extension unit, and the number of output ports can be increased by connecting the extension unit to the base unit in cascade.

CITATION LIST

Patent Document

Patent Document 1: Japanese Patent Application Laid-Open No. 2009-134192

SUMMARY OF INVENTION

Technical Problem

In the wavelength selective optical switch in Patent Document 1 in which the extension unit is connected to the base unit in cascade, part of the inputted optical signal is transmitted through a switch portion in the base unit and is then transmitted through a switch portion again in the extension unit to be outputted. Specifically, when the wavelength selective optical switch is extended to have 8 input ports and 16 output ports by connecting the extension unit to the base unit with 8 input ports and 8 output ports, part of the inputted optical signal is transmitted through a 1×9 switch on the base unit and is then transmitted through a 1×9 switch on the extension unit again to be outputted. The 1×9 switch has a configuration in which Mach-Zehnder interferometers (MZIs) are connected in multiple stages, and an optical signal incurs a relatively-great loss when passing through the 1×9 switch. Moreover, when another extension unit is connected to a next stage of the extension unit in cascade, the number of switch portions through which the optical signal should be transmitted increases in proportion to the number of extension units. As described above, the wavelength selective optical switch in Patent Document 1 has a problem that a relatively-great loss occurs due to extension and the more the wavelength selective optical switch is extended, the greater the loss becomes.

The present invention has been made in view of the problems described above, and an object thereof is to provide a switch device for an optical signal which has high extendibility and which can suppress an increase of loss in extension.

One aspect of the present invention is a switch device for an optical signal, comprising: a housing; first and second splitter portions which are provided in the housing and which each include a plurality of optical splitters each having a common port and a plurality of branch ports and configured to perform division and merging of the optical signal between the common port and the plurality of branch ports; first and second switch portions which are provided in the housing and which each include a plurality of optical switches each having a common port and a plurality of branch ports and configured to perform route selection of the optical signal between the plurality of branch ports and the common port; and an extension splitter portion which is provided in the housing and which includes a plurality of optical splitters each having a common port and a plurality of branch ports and configured to perform division and merging of the optical signal between the common port and the plurality of branch ports, wherein the plurality of branch ports of the first splitter portion are connected to the plurality of branch ports of the first switch portion, and the plurality of branch ports of the second splitter portion are connected to the plurality of branch ports of the second switch portion, and the plurality of branch ports of the extension splitter portion and the common ports of the first and second splitter portions are connectable to each other outside the housing.

Another aspect of the present invention is a switch device for an optical signal comprising: first and second housings; a first splitter portion which is provided in the first housing and which includes a plurality of optical splitters each having a common port and a plurality of branch ports and configured to perform division and merging of the optical signal between the common port and the plurality of branch ports; a first switch portion which is provided in the first housing and which includes a plurality of optical switches each having a common port and a plurality of branch ports and configured to perform route selection of the optical signal between the plurality of branch ports and the common port; an extension splitter portion which is provided in the first housing and which includes a plurality of optical splitters each having a common port and a plurality of branch ports and configured to perform division and merging of the optical signal between the common port and the plurality of branch ports; a second splitter portion which is provided in the second housing and which includes a plurality of optical splitters each having a common port and a plurality of branch ports and configured to perform division and merging of the optical signal between the common port and the plurality of branch ports; a second switch portion which is provided in the second housing and which includes a plurality of optical switches each having a common port and a plurality of branch ports and configured to perform route selection of the optical signal between the plurality of branch ports and the common port, wherein the plurality of branch ports of the first splitter portion are connected to the plurality of branch ports of the first switch portion, and the plurality of branch ports of the second splitter portion are connected to the plurality of branch ports of the second switch portion, and the plurality of branch ports of the extension splitter portion and the common ports of the first and second splitter portions are connectable to each other outside the first and second housings.

The switch device in the present invention includes, in the housing, the extension splitter portion used to change the number of wavelengths and is configured such that the extension splitter portion and the splitter portion are connectable outside the housing. Accordingly, the number of wavelength can be easily changed by changing a connection state of the optical fibers outside the housing. Moreover, since the extension splitter portion used to change the number of wavelengths simply divides the optical signal, an increase of loss occurring due to an increase in the number of wavelengths can be suppressed.

DESCRIPTION OF EMBODIMENTS

Figure 1:
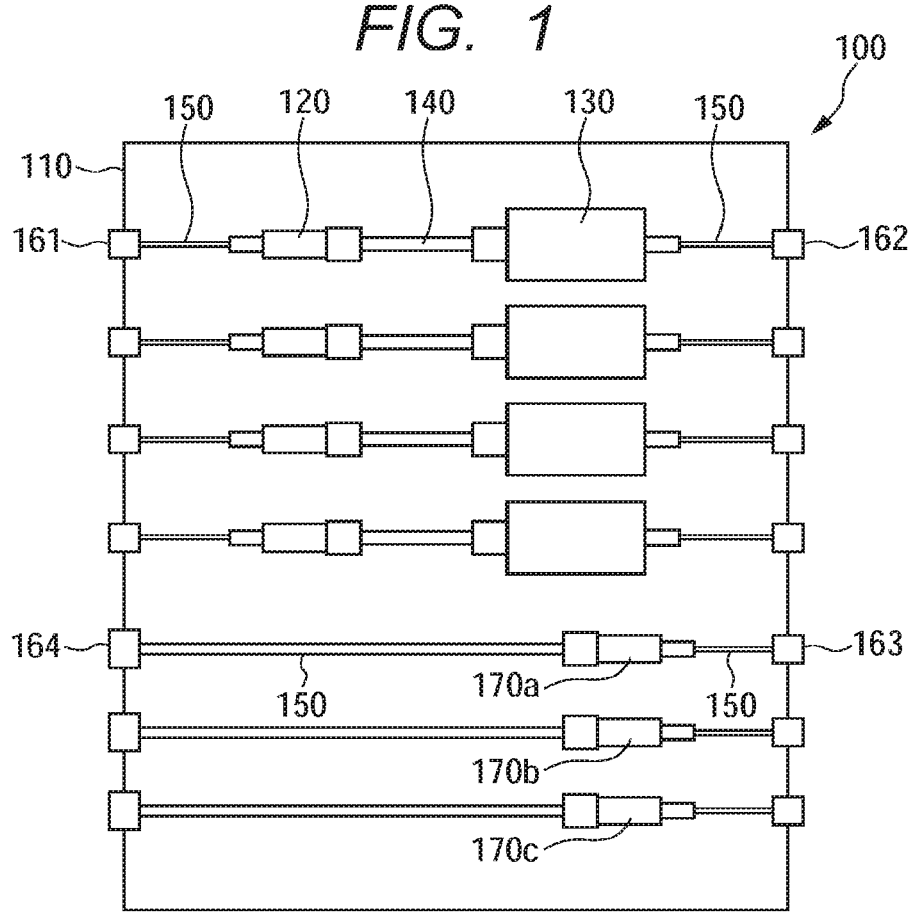
FIG. 1 is a top view of a switch device in one embodiment of the present invention.

Although embodiments of the present invention are described below with reference to the drawings, the present invention is not limited to the embodiments. Note that, in the drawings described below, parts having the same function are denoted by the same reference numeral, and repeated description thereof is sometimes omitted.

First Embodiment

FIG. 1 is a top view of a switch device 100 in the embodiment. The switch device 100 is connectable between a ROADM network with multiple paths and a group of multiple client devices. The switch device 100 is capable of dropping an optical signal from a path of the ROADM network to a desired client device which is a Drop function, or adding a signal from a client device to a desired path of the ROADM network which is an Add function. The switch device 100 is configured such that the number of paths is 8 and the number of wavelengths is selectable (extendable) from one of 8, 16, 24, and 32.

The switch device 100 includes, in a housing 110, four splitter portions 120, four switch portions 130 connected respectively to the splitter portions 120, and extension splitter portions 170a, 170b, 170c. The splitter portions 120 are connected respectively to path-side ports 161 via multiple optical fibers 150, and the switch portions 130 are connected respectively to client-side ports 162 via multiple optical fibers 150. The splitter portions 120 and the switch portions 130 are connected to one another via shuffle fiber arrays 140 having multiple optical fibers which are three-dimensionally arranged. One ends of the extension splitter portions 170a, 170b, 170c are connected respectively to path-side extension ports 163 via multiple optical fibers 150, and the other ends thereof are connected respectively to client-side extension ports 164 via multiple optical fibers 150. The path-side ports 161, the client-side ports 162, the path-side extension ports 163, and the client-side extension ports 164 are provided on the housing 110, and the optical fibers 150 are connectable to optical fibers from the outside of the switch device 100, via these ports.

Figure 2:
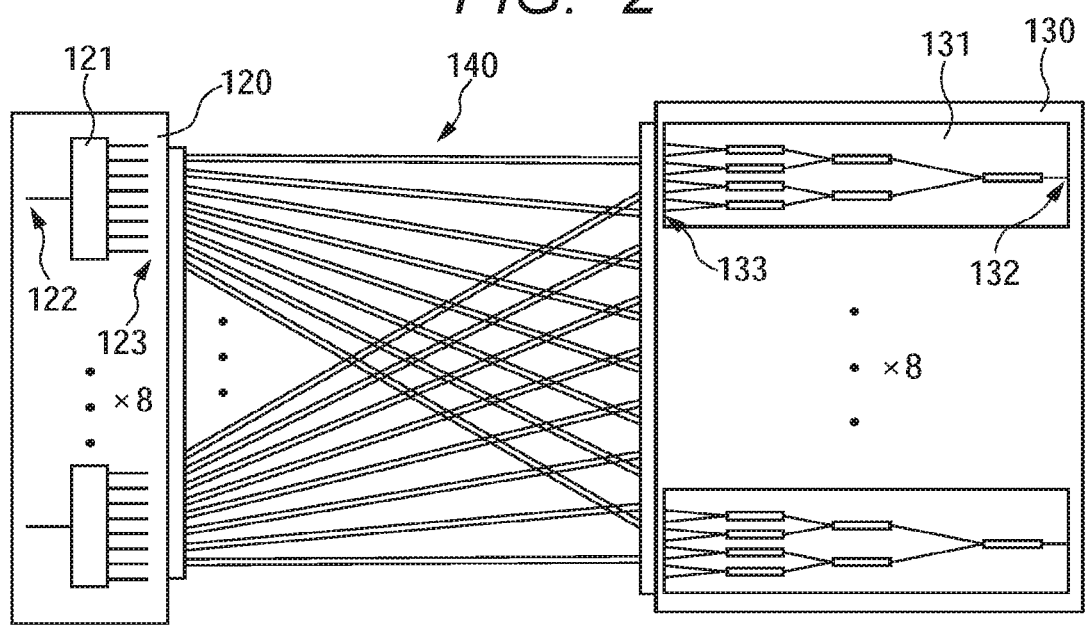
FIG. 2 is a schematic view of a splitter portion and a switch portion in one embodiment of the present invention.

FIG. 2 is a schematic view of each pair of the splitter portion 120 and the switch portion 130. The splitter portion 120 includes eight optical splitters 121 on one chip (substrate). Each of the optical splitters 121 is a 1×8 optical splitter, and has one common port 122 at one end and eight branch ports 123 at another end. An optical signal inputted from the common port 122 is divided and outputted to the branch ports 123, or optical signals inputted from the branch ports 123 are merged and outputted to the common port 122. The splitter portion 120 is manufactured by, for example, using a PLC formed on a quartz substrate.

The switch portion 130 includes eight optical switches 131 on one chip (substrate). Each of the optical switches 131 is a 1×8 optical switch which is controlled by a not-illustrated control unit to enable selection of a route of an optical signal, and has one common port 132 at one end and eight branch ports 133 at another end. An optical signal inputted from the common port 132 is outputted to one of the branch ports 133 according to the control, or an optical signal inputted from each of the branch ports 133 is outputted to the common port 132 or discarded without being outputted, according to the control. A configuration in which each optical switch 131 includes multiple MZIs connected in multiple stages can be given as an exemplary configuration. In this configuration, the control unit drives a heater provided for each MZI to change the branch ratio of the MZI, and the route of the optical signal transmitted through the optical switch 131 can be thereby selected. The optical switches 131 are manufactured by, for example, using a PLC formed on a silicon substrate.

The splitter portion 120 and the switch portion 130 are connected to each other by the shuffle fiber array 140. The shuffle fiber array 140 has multiple (64 in the embodiment) optical fibers which are provided between the splitter portion 120 and the switch portion 130 to be three-dimensionally arranged. The 64 optical fibers of the shuffle fiber array 140 connect the branch ports 123 (total of 64 ports) of the eight optical splitters 121 included in the splitter portion 120 and the branch ports 133 (total of 64 ports) of the eight optical switches 131 included in the switch portion 130 to one another. The eight branch ports 123 included in each of the optical splitters 121 are connected respectively to the branch ports 133 of the different optical switches 131.

Figure 3:
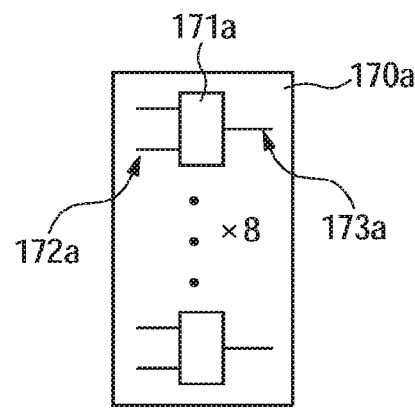
FIG. 3 is a schematic view of extension splitter portions in one embodiment of the present invention.
Figure 3:
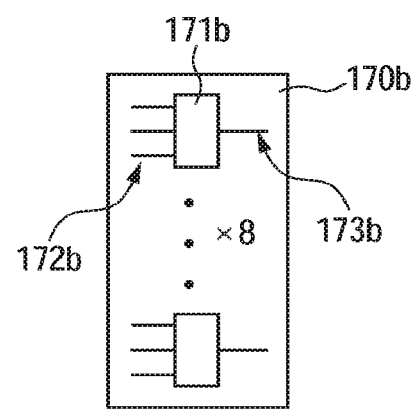
Figure 3:
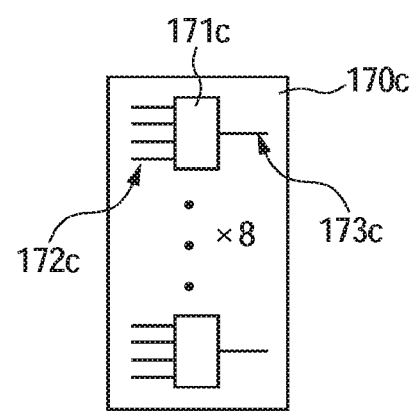

FIG. 3 is a schematic view of the extension splitter portions 170a, 170b, 170c. The extension splitter portions 170a, 170b, 170c (also referred to as 1×N extension splitter portions depending on the number N of branches) each includes eight optical splitters 171a, 171b, 171c on one chip (substrate). The optical splitters 171a, 171b, 171c are 1×N optical splitters having different numbers of branches, and each have one common port 173a, 173b, 173c at one end and N branch ports 172a, 172b, 172c at another end. The number N of branches is set depending on a ratio between the number of paths and the number of wavelengths. In the embodiment, the optical splitters 171a each have two branches, the optical splitters 171b each have three branches, and the optical splitters 171c each have four branches. An optical signal inputted from the common port 173a, 173b, 173c is divided and outputted to the branch ports 172a, 172b, 172c. Meanwhile, optical signals inputted from the branch ports 172a, 172b, 172c are merged and outputted to the common port 173a, 173b, 173c. The extension splitter portions 170a, 170b, 170c are manufactured by, for example, using a PLC formed on a quartz substrate.

Figure 4:
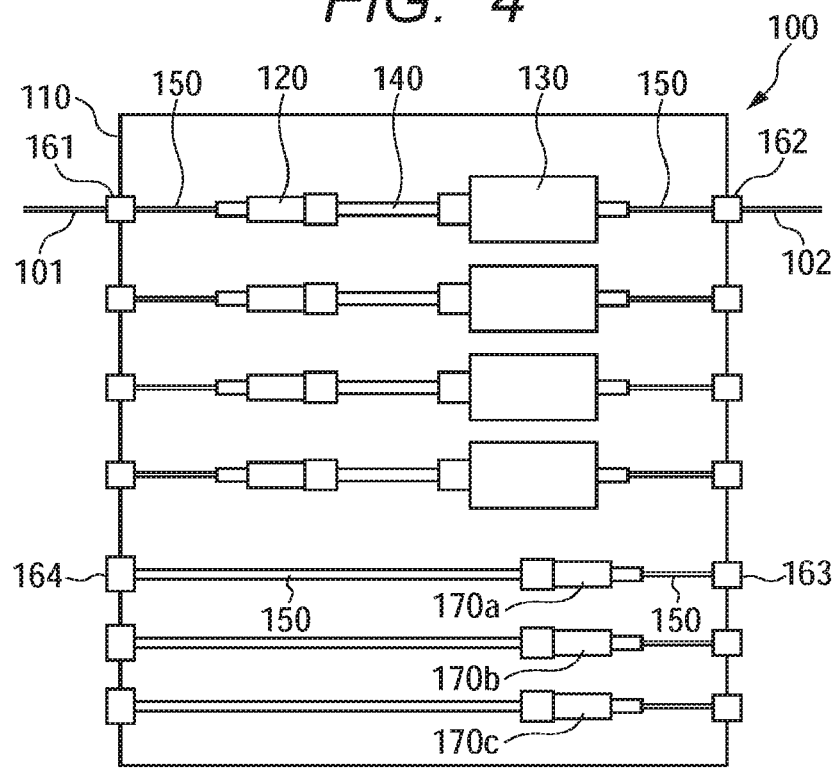
FIG. 4 is a view illustrating a connection state of the switch device in one embodiment of the present invention.

In the switch device 100, the number of processable wavelengths can be easily changed by changing a connection state of the optical fibers to the path-side ports 161, the client-side ports 162, the path-side extension ports 163, and the client-side extension ports 164. FIG. 4 is a view illustrating a connection state in the case where the switch device 100 is used with the number of paths being 8 and the number of wavelengths being 8. In the state of FIG. 4, path-side optical fibers 101 (eight fibers) connected to the ROADM network are connected to one of the path-side ports 161, and client-side optical fibers 102 (eight fibers) connected to the client devices are connected to the client-side port 162 on the same channel as the path-side port 161 to which the path-side optical fibers 101 are connected. Connecting the optical fibers 101, 102 as described above causes one set of the splitter portion 120 and the switch portion 130 to operate. Accordingly, the switch device 100 can perform a Drop operation or an ADD operation with the number of paths being 8 and the number of wavelengths being 8.

Figure 5:
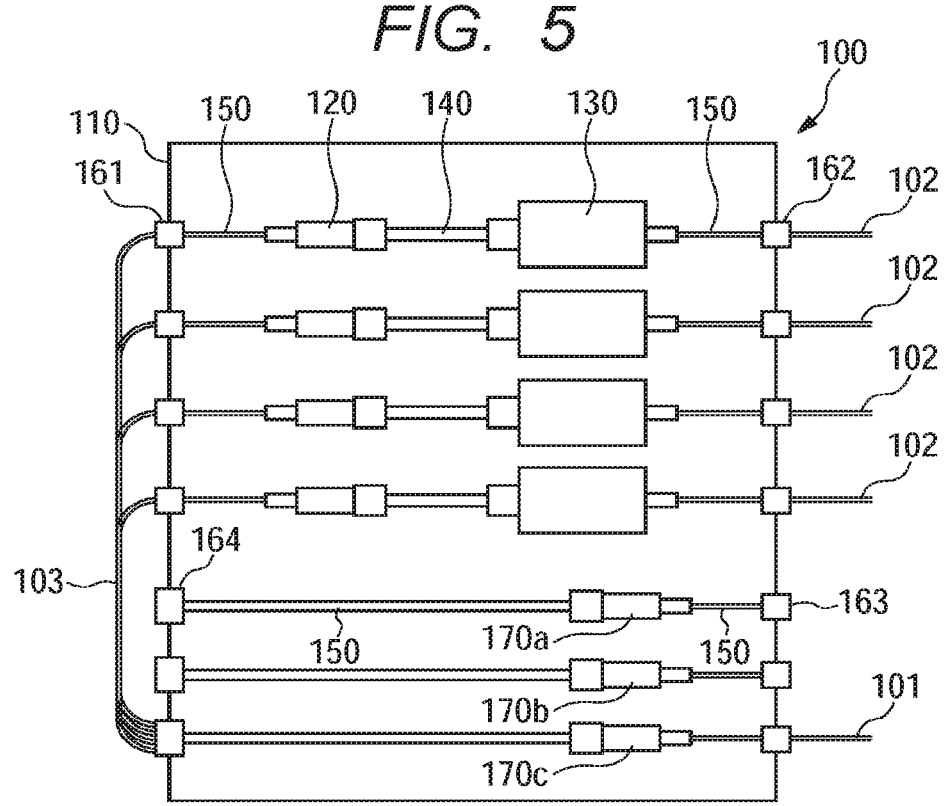
FIG. 5 is a view illustrating a connection state of the switch device in one embodiment of the present invention.

FIG. 5 is a view illustrating a connection state in the case where the switch device 100 is used with the number of paths being 8 and the number of wavelengths being 32. In the state of FIG. 5, the path-side optical fibers 101 (eight fibers) connected to the ROADM network is connected to the path-side extension port 163 of the 1×4 extension splitter portion 170c. Extension optical fibers 103 (32 fibers) are connected such that eight extension optical fibers 103 are connected between the client-side extension port 164 of the 1×4 extension splitter portion 170c and each of the four path-side ports 161. The client-side optical fibers 102 (32 fibers) connected to the client devices are connected such that eight client-side optical fibers 102 are connected to each of the four client-side ports 162. Connecting the optical fibers 101, 102, 103 as described above causes four sets of the splitter portion 120 and the switch portion 130 to operate. Accordingly, the switch device 100 can perform the Drop operation or the Add operation with the number of paths being 8 and the number of wavelengths being 32.

Similarly, in the case where the switch device 100 is used with the number of paths being 8 and the number of wavelengths being 16, the path-side optical fibers 101 (eight fibers) are connected to the path-side extension port 163 of the 1×2 extension splitter portion 170a, the extension optical fibers 103 (16 fibers) are connected such that eight extension optical fibers 103 are connected between the client-side extension port 164 of the 1×2 extension splitter portion 170a and each of two of the path-side ports 161, and the client-side optical fibers 102 (16 fibers) are connected such that eight client-side optical fibers 102 are connected to each of the client-side ports 162 on the same channels as the path-side ports 161 to which the extension optical fibers 103 are connected. In the case where the switch device 100 is used with the number of paths being 8 and the number of wavelengths being 24, the path-side optical fibers 101 (eight fibers) are connected to the path-side extension port 163 of the 1×3 extension splitter portion 170b, the extension optical fibers 103 (24 fibers) are connected such that eight extension optical fibers 103 are connected between the client-side extension port 164 of the 1×3 extension splitter portion 170b and three of the path-side ports 161, and the client-side optical fibers 102 (24 fibers) are connected such that eight client-side optical fibers 102 are connected to each of the client-side ports 162 on the same channels as the path-side ports 161 to which the extension optical fibers 103 are connected.

In the switch device 100 in the embodiment, the number of wavelengths can be easily changed only by changing the connection portions of the optical fibers, and there is no need to replace the housing in the changing of the number of wavelengths. Moreover, in the switch device 100 in the embodiment, the number of wavelengths can be increased only by transmitting the optical signals through a minimum number of optical splitters. Accordingly, an increase of loss can be suppressed in extension compared to the technique of Patent Document 1 described above. Specifically, in the case of increasing the number of wavelengths from 8 to 16, the optical signal needs to be transmitted through the 1×9 optical switches in the technique described in Patent Document 1. On the other hand, the optical signal is transmitted only through the 1×2 optical splitter in the switch device 100 in the embodiment.

In the embodiment, the switch device 100 in which the number of paths is 8 and the number of wavelengths is selectable from one of 8, 16, 24, and 32 is given as an example. However, the numbers in the present invention are not limited to these specific numbers, and the present invention can be applied to any number of paths and any number of wavelengths. In the case where the number of wavelengths is to be selectable from 8 or 16, the switch device 100 only needs to include two sets of the splitter portion 120 and the switch portion 130 and one extension splitter portion 170a. The number of branches and the number of chips in each of the splitter portions 120, the switch portions 130, and the extension splitter portions 170a, 170b, 170c can be set to any numbers depending on the target number of paths and the target number of wavelengths.

Second Embodiment

The switch device 100 in the first embodiment performs either the Drop operation or the Add operation in one housing. Meanwhile, a switch device 200 of the embodiment performs both of the Drop operation and the Add operation in one housing.

Figure 6:
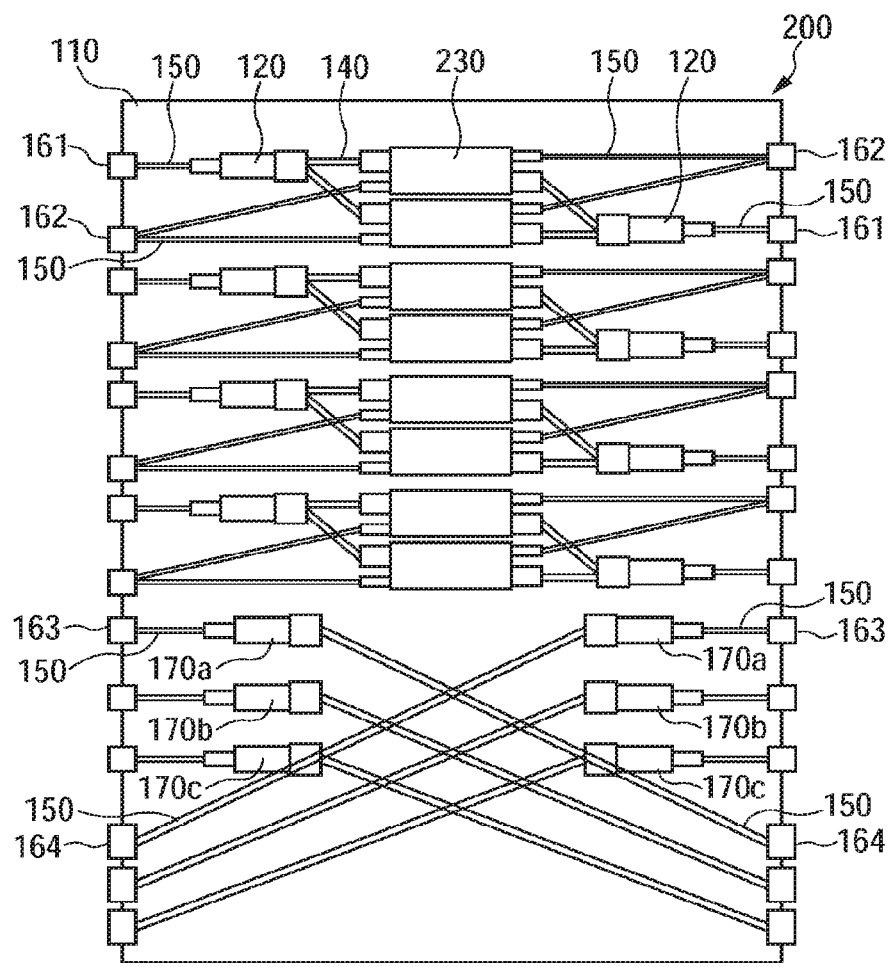
FIG. 6 is a top view of a switch device in one embodiment of the present invention.

FIG. 6 is a top view of the switch device 200 in the embodiment. As in the first embodiment, the switch device 200 is configured such that the number of paths is 8 and the number of wavelengths is selectable (extendable) from one of 8, 16, 24, and 32. The switch device 200 includes, in one housing 110, two sets of the components (excluding the switch portions 130) of the switch device 100 in the first embodiment, and includes switch portions 230 in the embodiment, instead of the switch portions 130 in the first embodiment.

Figure 7:
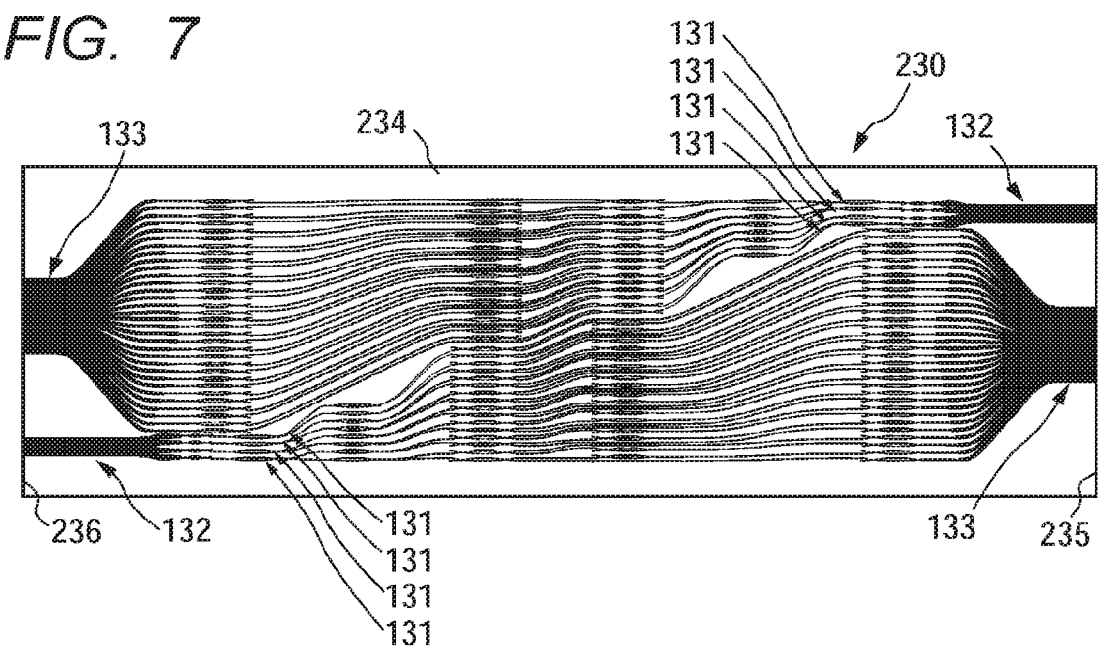
FIG. 7 is a top view of the switch portion in one embodiment of the present invention.

FIG. 7 is a top view of each of the switch portions 230 in the embodiment. The switch portion 230 includes eight optical switches 131 on one chip (substrate) 234. Four out of the eight optical switches 131 have common ports 132 (total of four ports) on a first end surface 235 of the chip 234 and have branch ports 133 (total of 32 ports) on a second end surface 236 of the chip 234 which is opposite to the first end surface 235. Meanwhile, the other four optical switches 131 have common ports 132 (total of four ports) on the second end surface 236 and have branch ports 133 (total of 32 ports) on the first end surface 235.

32 of branch ports 123 (total of 64 ports) of each splitter portion 120 are connected to the branch ports 133 of one switch portion 230, and the other 32 branch ports 123 are connected to the branch ports 133 of another switch portion 230. Furthermore, the common ports 132 (total of eight ports) of these two switch portions 230 are connected to one client-side port 162. The splitter portion 120, the switch portions 230, and the client-side port 162 are connected in a similar way also in the opposite direction. Such connection can cause the two switch portions 230 to perform, as one set, an eight-channel Drop operation and an eight-channel Add operation.

Since the amount of wiring on the common port 132 side of the optical switches 131 is small, unused spaces are formed near the common ports 132. In each of the switch portions 230 in the embodiment, some of the optical switches 131 included in the switch portion 230 are arranged in a reversed manner to the other optical switches 131. Accordingly, the branch ports 133 can be arranged in the unused spaces formed on the common port 132 sides of the optical switches 131. Hence, the size of the switch portion 230 can be reduced.

In the switch device 200 in the embodiment, since the configuration other than the switch portions 230 is the same as that in the first embodiment, it is possible to easily change the number of wavelengths and suppress an increase of loss in extension as in the first embodiment.

Third Embodiment

In the switch devices 100, 200 in the first and second embodiments, all components are included in one housing. Meanwhile, in a switch device 300 in the embodiment, components are disposed to be distributed in multiple housings.

Figure 8:
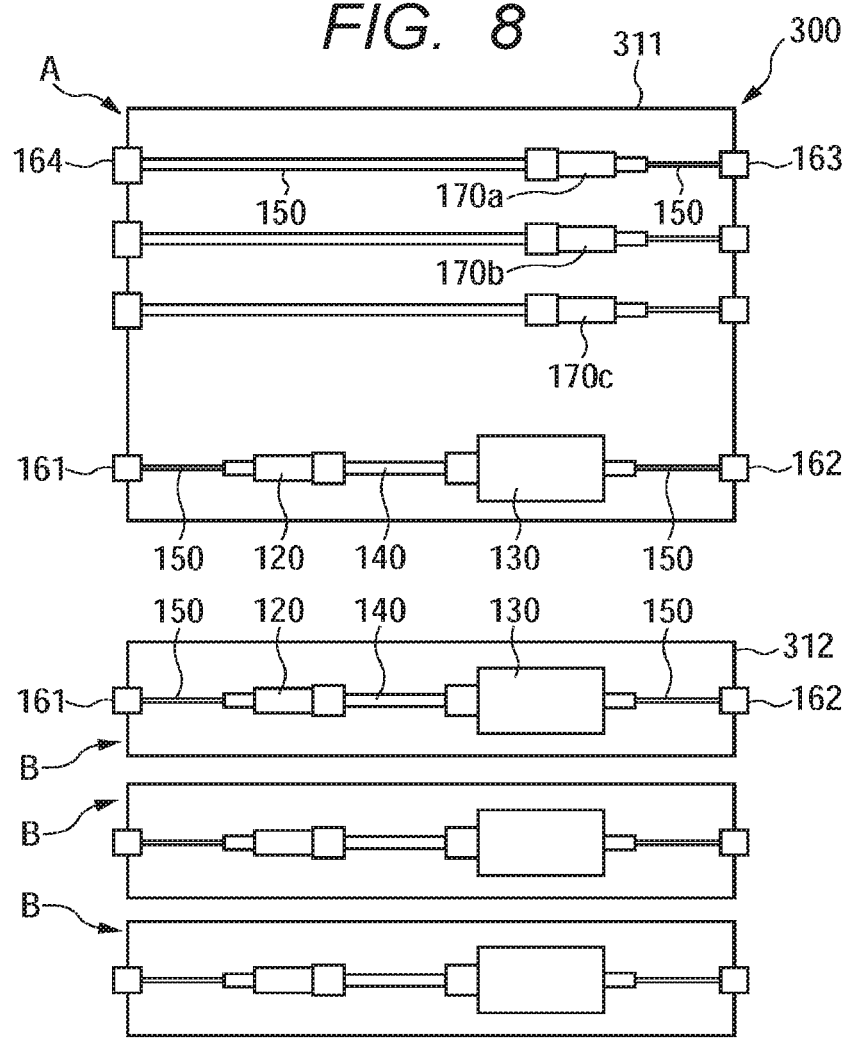
FIG. 8 is a top view of a switch device in one embodiment of the present invention.

FIG. 8 is a top view of the switch device 300 in the embodiment. The switch device 300 is configured such that the number of paths is 8 and the number of wavelengths is selectable (extendable) from one of 8, 16, 24, and 32.

Since the switch device 300 has the same configuration as that of the switch device 100 in the first embodiment, except for the housing, only the points different from the switch device 100 are described below. The switch device 300 includes a base unit A and three extension units B connectable to the base unit A. The base unit A includes one splitter portion 120, one switch portion 130, extension splitter portions 170a, 170b, 170c in a base housing 311. Each of the extension units B includes one splitter portion 120 and one switch portion 130 in an extension housing 312. The splitter portions 120 and the switch portions 130 are connected to path-side ports 161 and client-side ports 162 provided in the base housing 311 and the extension housing 312, via multiple optical fibers 150. The extension splitter portions 170a, 170b, 170c are connected to path-side extension ports 163 and client-side extension ports 164 provided in the base housing 311, via multiple optical fibers 150.

Figure 9:
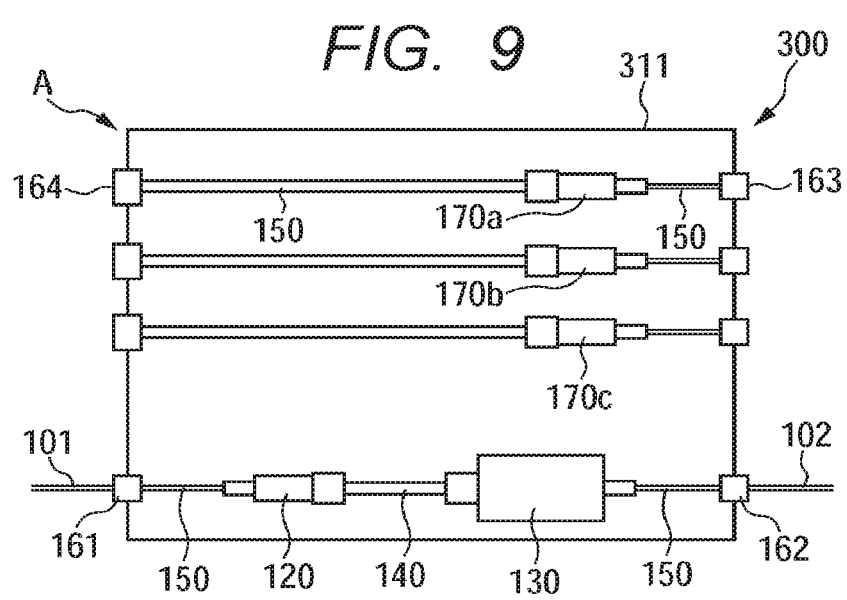
FIG. 9 is a view illustrating a connection state of the switch device in one embodiment of the present invention.

In the switch device 300, the number of processable wavelengths can be easily changed by changing the number of extension units B and a connection state of optical fibers to the path-side ports 161, the client-side ports 162, the path-side extension ports 163, and the client-side extension ports 164. FIG. 9 is a view illustrating a connection state in the case where the switch device 300 is used with the number of paths being 8 and the number of wavelengths being 8. In this case, only the base unit A is used, and no extension unit B is used. In the state of FIG. 9, path-side optical fibers 101 (eight fibers) connected to a ROADM network are connected to the path-side port 161 on the base housing 311, and client-side optical fibers 102 (eight fibers) connected to client devices are connected to the client-side port 162 on the base housing 311. Connecting the optical fibers 101, 102 as described above causes one set of the splitter portion 120 and the switch portion 130 to operate. Accordingly, the switch device 300 can perform a Drop operation or an ADD operation with the number of paths being 8 and the number of wavelengths being 8.

Figure 10:
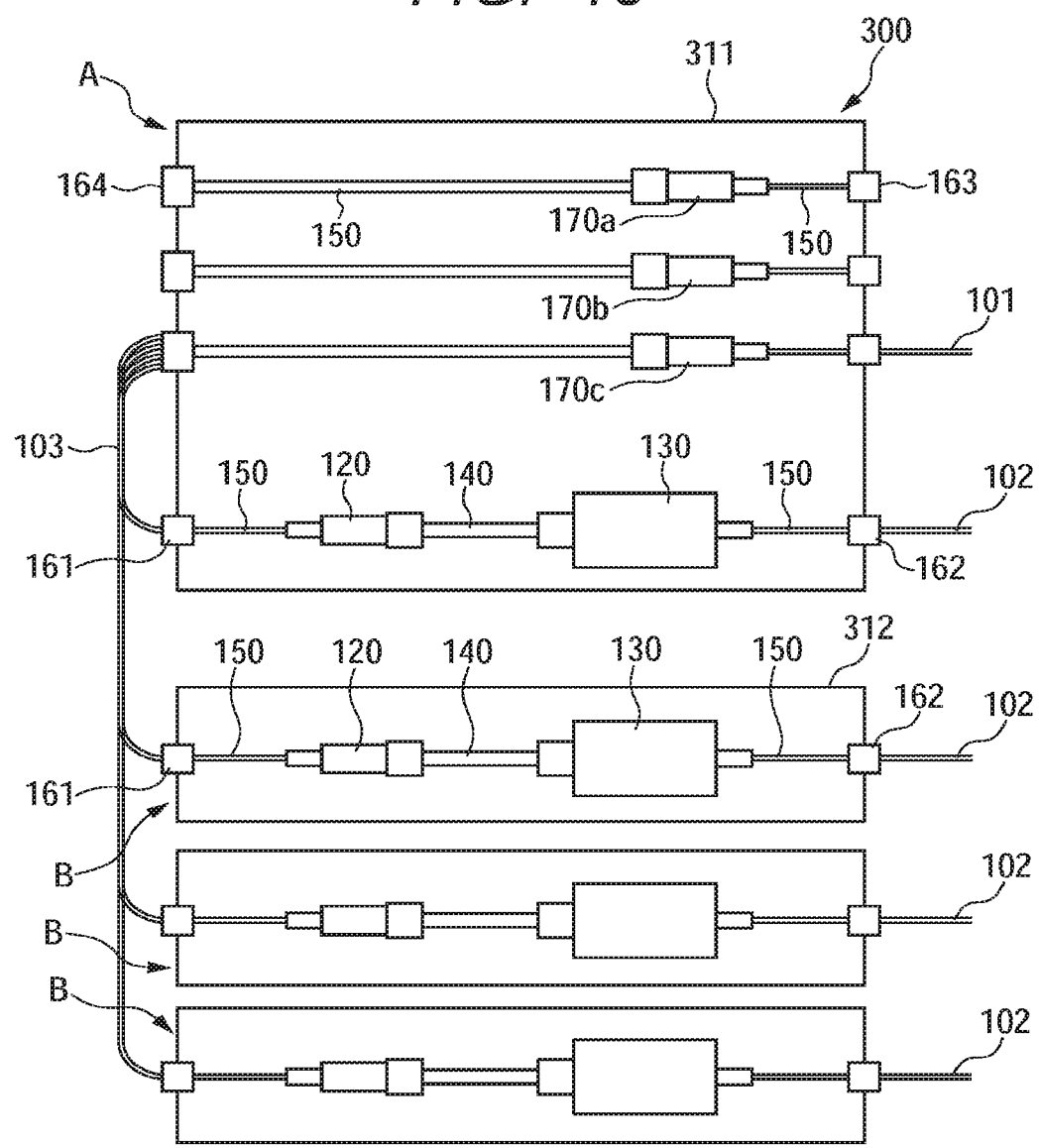
FIG. 10 is a view illustrating a connection state of the switch device in one embodiment of the present invention.

FIG. 10 is a view illustrating a connection state in the case where the switch device 300 is used with the number of paths being 8 and the number of wavelengths being 32. In this case, the base unit A and three extension units B are used. In the state of FIG. 10, the path-side optical fibers 101 (eight fibers) connected to the ROADM network are connected to the path-side extension port 163 of the 1×4 extension splitter portion 170c. Extension optical fibers 103 (32 fibers) are connected such that eight extension optical fibers 103 are connected between the client-side extension port 164 of the 1×4 extension splitter portion 170c and each of the path-side ports 161 (total of four ports) on the base housing 311 and the three extension housings 312. The client-side optical fibers 102 (32 fibers) connected to the client devices are connected such that eight client-side optical fibers 102 are connected to each of the client-side ports 162 (total of four ports) on the base housing 311 and the three extension housings 312. Connecting the optical fibers 101, 102, 103 as described above causes four sets of the splitter portion 120 and the switch portion 130 to operate. Accordingly, the switch device 300 can perform the Drop operation or the ADD operation with the number of paths being 8 and the number of wavelengths being 32.

Similarly, in the case where the switch device 300 is used with the number of paths being 8 and the number of wavelengths being 16, the base unit A and one extension unit B are used. The path-side optical fibers 101 (eight fibers) are connected to the path-side extension port 163 of the 1×2 extension splitter portion 170a, the extension optical fibers 103 (16 fibers) are connected such that eight extension optical fibers 103 are connected between the client-side extension port 164 of the 1×2 extension splitter portion 170a and each of the path-side ports 161 (total of two ports) on the base housing 311 and the one extension housing 312, and the client-side optical fibers 102 (16 fibers) are connected such that eight client-side optical fibers 102 are connected to each of the client-side ports 162 on the same channels as the path-side ports 161 to which the extension optical fibers 103 are connected. In the case where the switch device 300 is used with the number of paths being 8 and the number of wavelengths being 24, the base unit A and two extension units B are used. The path-side optical fibers 101 (eight fibers) are connected to the path-side extension port 163 of the 1×3 extension splitter portion 170b, the extension optical fibers 103 (24 fibers) are connected between the client-side extension port 164 of the 1×3 extension splitter portion 170b and the path-side ports 161 (total of three ports) on the base housing 311 and the two extension housings 312, and the client-side optical fibers 102 (24 fibers) are connected such that eight client-side optical fibers 102 are connected to each of the client-side ports 162 on the same channels as the path-side ports 161 to which the extension optical fibers 103 are connected.

In the switch device 300 in the embodiment, the number of wavelengths can be easily changed only by changing the connection portions of the optical fibers. Moreover, in the switch device 300 in the embodiment, the number of wavelengths can be increased only by transmitting the optical signals through a minimum number of optical splitters. Accordingly, an increase of loss can be suppressed in extension compared to the technique of Patent Document 1 described above. Specifically, in the case of increasing the number of wavelengths from 8 to 16, the optical signal needs to be transmitted through the 1×9 optical switches in the technique described in Patent Document 1. However, the optical signal is transmitted only through the 1×2 optical splitter in the switch device 300 in the embodiment. Moreover, since the switch device 300 in the embodiment includes the base unit and the extension units which are provided in the separate housings, the number of extension units (i.e. the number of housings) can be increased or reduced depending on the number of required wavelengths. Accordingly, the manufacturing cost and installation space of the switch device 300 can be suppressed to a minimum, and the extension units can be shared with other switch devices 300.

In the embodiment, the switch device 300 in which the number of paths is 8 and the number of wavelengths is selectable from one of 8, 16, 24, and 32 is given as an example. However, the numbers in the present invention are not limited to these specific numbers, and the present invention can be applied to any number of paths and any number of wavelengths. In the case where the number of wavelengths is to be selectable from 8 or 16, the switch device 300 only needs to include: the base unit A having one set of the splitter portion 120 and the switch portion 130 and one extension splitter portion 170; and the extension unit B having one set of the splitter portion 120 and the switch portion 130. The number of branches and the number of chips in each of the splitter portions 120, the switch portions 130, and the extension splitter portions 170a, 170b, 170c can be set to any numbers depending on the target number of paths and the target number of wavelengths.

Although the switch device 300 in the embodiment performs either the Drop operation or the Add operation, the switch device 300 may be configured to perform both of the Drop operation and the Add operation as in the second embodiment.

Fourth Embodiment

In the switch devices in the first to third embodiments, the number of wavelengths can be changed. Meanwhile, in a switch device 400 in the embodiment, the number of paths can be changed in addition to the number of wavelengths.

Figure 11:
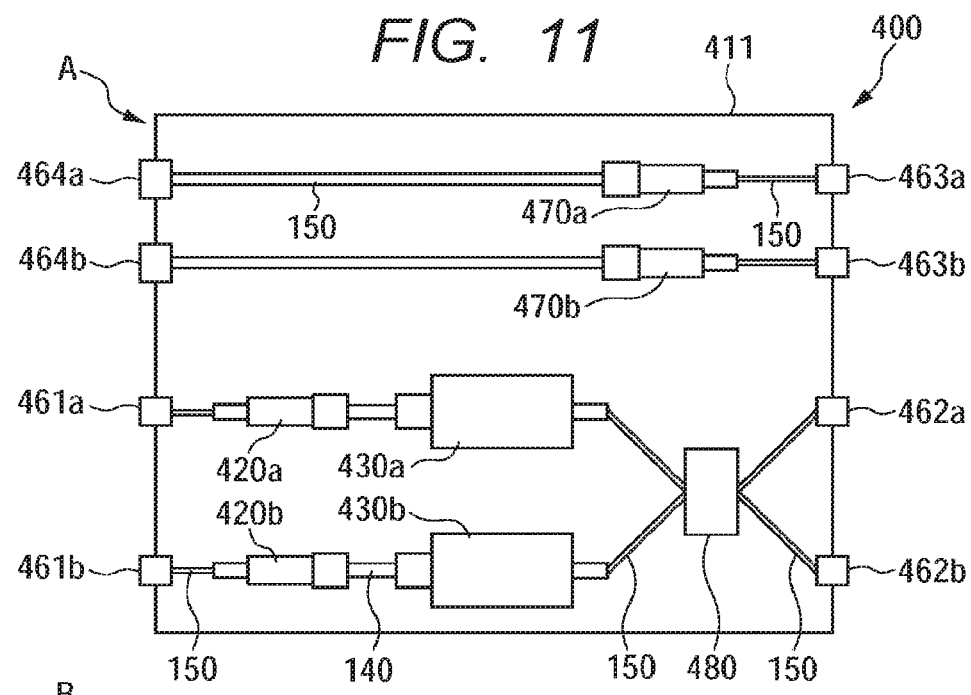
FIG. 11 is a top view of a switch device in one embodiment of the present invention.

FIG. 11 is a top view of the switch device 400 in the embodiment. The switch device 400 is configured such that the number of wavelengths is selectable (extendable) from 8 or 16 and the number of paths is selectable (extendable) from 8 or 16.

The switch device 400 includes a base unit A and an extension unit B connectable to the base unit A. The base unit A includes splitter portions 420*a*, 420*b*, switch portions 430*a*, 430*b*, an extension switch portion 480, extension splitter portions 470*a*, 470*b* in a base housing 411. The extension unit B includes splitter portions 420*a*, 420*b*, switch portions 430*a*, 430*b*, and an extension switch portion 480 in an extension housing 412.

In each of the base housing 411 and the extension housing 412, one ends of the splitter portions 420*a*, 420*b* are connected respectively to path-side ports 461*a*, 461*b* via multiple optical fibers 150, and other ends of the splitter portions 420*a*, 420*b* are connected respectively to one ends of the switch portions 430*a*, 430*b* via shuffle fiber arrays 140. Furthermore, other ends of the switch portions 430*a*, 430*b* are connected to one end of one extension switch portion 480 via multiple optical fibers 150. Another end of the extension switch portion 480 is connected to client-side ports 462*a*, 462*b* via multiple optical fibers 150.

In the base housing 411, one ends of the extension splitter portions 470*a*, 470*b* are connected respectively to path-side extension ports 463*a*, 463*b* via multiple optical fibers 150, and other ends of the extension splitter portions 470*a*, 470*b* are connected respectively to client-side extension ports 464*a*, 464*b* via multiple optical fibers 150. In the embodiment, the extension splitter portions 470*a*, 470*b* are both 1×2 extension splitter portions in which the number of branches is two.

The path-side ports 461*a*, 461*b* and the client-side ports 462*a*, 462*b* are provided on the base housing 411 and the extension housing 412, and the path-side extension ports 463*a*, 463*b* and the client-side extension ports 464*a*, 464*b* are provided on the base housing 411. The optical fibers 150 are connectable to optical fibers from the outside of the switch device 400 via these ports.

Figure 12:
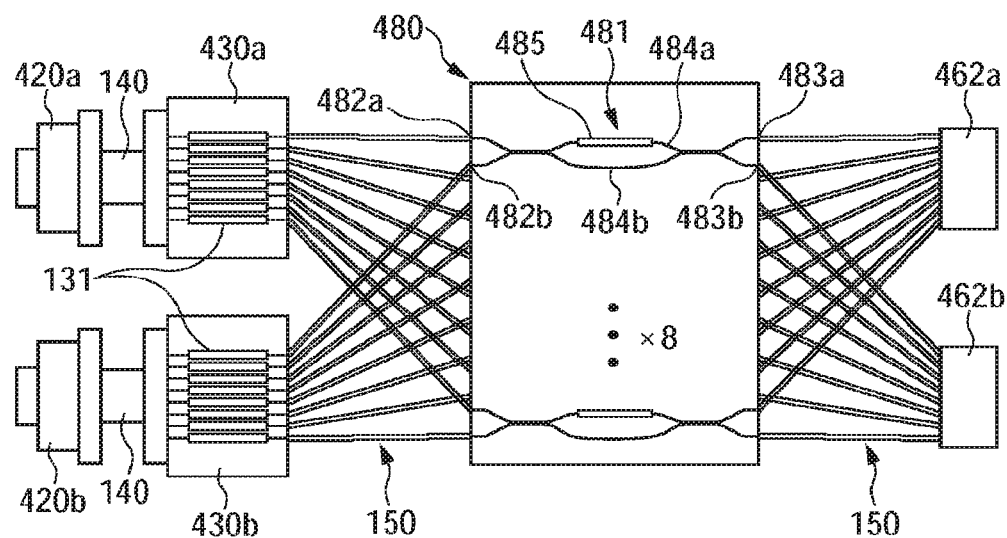
FIG. 12 is a schematic view of the switch device in one embodiment of the present invention.

FIG. 12 is a schematic view of the splitter portions 420*a*, 420*b*, the switch portions 430*a*, 430*b*, and the extension switch portion 480. The splitter portions 420*a*, 420*b* each have the same configuration as the splitter portion 120 in the first embodiment. The switch portions 430*a*, 430*b* each have the same configuration as the switch portion 130 in the first embodiment. The splitter portions 420*a*, 420*b* are connected respectively to the switch portions 430*a*, 430*b* via the shuffle fiber arrays 140 as in the first embodiment.

The extension switch portion 480 includes eight Mach-Zehnder interferometers (MZIs) 481 on one chip (substrate). Each of the MZIs 481 has two waveguides 484*a*, 484*b*. First ports 482*a*, 482*b* are provided respectively at one ends of the waveguides 484*a*, 484*b*, and second ports 483*a*, 483*b* are provided respectively at other ends of the wave guides 484*a*, 484*b*. Note that, since the MZI 481 has no directivity, the names of first ports and second ports are merely for discrimination, and the first ports and the second ports can be used for both of input and output. The two waveguides 484*a*, 484*b* form two couplers by coming close to each other in two portions. A heater 485 which is heating means is provided between the two couplers, near at least one of the waveguides 484*a*, 484*b*.

The length of the waveguides 484*a*, 484*b* and the positions of the couplers are adjusted such that, in a state where no heating is performed by the heater 485, an optical signal inputted from the first port 482*a* is outputted only from the second port 483*a* on the same side, and an optical signal inputted from the first port 482*b* is outputted only from the second port 483*b* on the same side. When one of the waveguides 484*a*, 484*b* is heated by the heater 485, the propagation speed of light in the heated waveguide decreases and changes such that the optical signal is outputted from one of the second ports 483*a*, 483*b* on the other side. Accordingly, which one of the second ports 483*a*, 483*b* a signal inputted from each of the first ports 482*a*, 482*b* is to be outputted to can be selected by controlling on and off of heating of the heater 485. The heater 485 is connected to a not-illustrated control unit, and the control unit can switch on and off of the heating of the heater 485 by controlling presence or absences of electric supply from the control unit to the heater 485. Such a configuration enables a route through which an optical signal is transmitted in the extension switch portion 480 to be dynamically changed.

Optical switches 131 (eight switches) included in each first switch portion 430*a* are connected respectively to the first ports 482*a* of the different MZIs 481, via the multiple optical fibers 150. Moreover, optical switches 131 (eight switches) of each second switch portion 430*b* are connected respectively to the first ports 482*b* of the different MZIs 481, via the multiple optical fibers 150. Furthermore, the second ports 483*a* of the eight MZIs 481 on the extension switch portion 480 are connected to the first client-side port 462*a* via the multiple optical fibers 150, and the second ports 483*b* of the eight MZIs 481 on the extension switch portion 480 are connected to the second client-side port 462*b* via the multiple optical fibers 150.

Figure 13A:
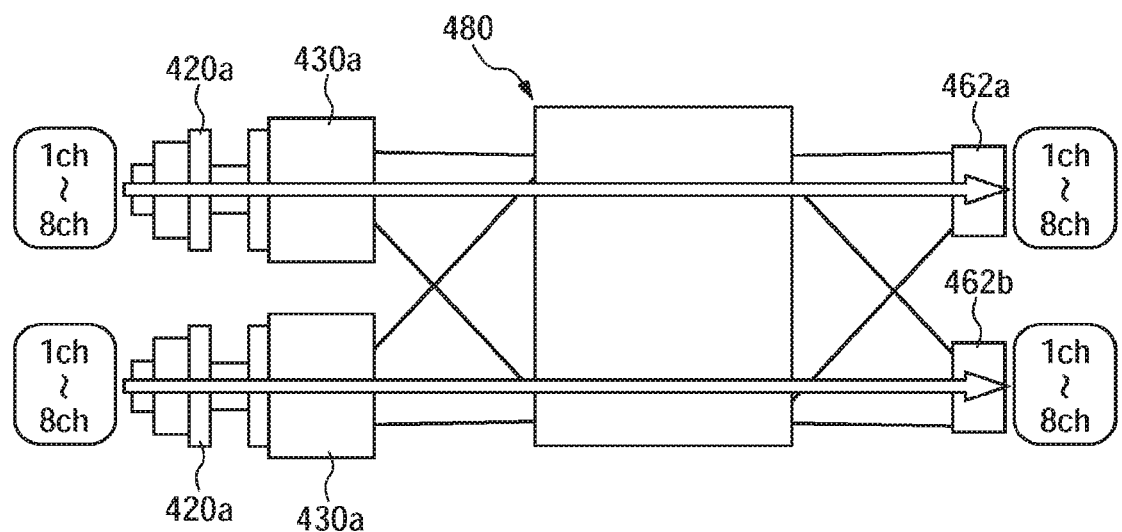
FIG. 13A is a view illustrating a switching operation by the switch device in one embodiment of the present invention.

FIG. 13A is a view illustrating a switching operation of the extension switch portion 480 in the case where the number of paths is 8. The paths are respectively referred to as 1 to 8 ch for the sake of convenience. Here, description is given of the Drop operation. In the Add operation, directions of input and output are opposite. First, each of optical signals of 1 to 8 ch is split into two in a previous stage of the extension switch portion 480, and the split optical signals of 1 to 8 ch are inputted to each of the first splitter portion 420*a* and the second splitter portion 420*b*. Then, the first switch portion 430*a* and the second switch portion 430*b* perform route selection. Thereafter, the optical signals are transmitted through the extension switch portion 480. In this case, no heating of the heaters 485 of the MZIs 481 is performed so that the optical signals inputted to the first ports 482*a* can be outputted only to the second ports 483*a* on the same side, and the optical signals inputted the first ports 482*b* can be outputted only to the second ports 483*b* on the same side. As a result, the optical signals of 1 to 8 ch from the first switch portion 430*a* are outputted to the first client-side port 462*a*, and the optical signals of 1 to 8 ch from the second switch portion 430*b* are outputted to the second client-side port 462*b*.

Figure 13B:
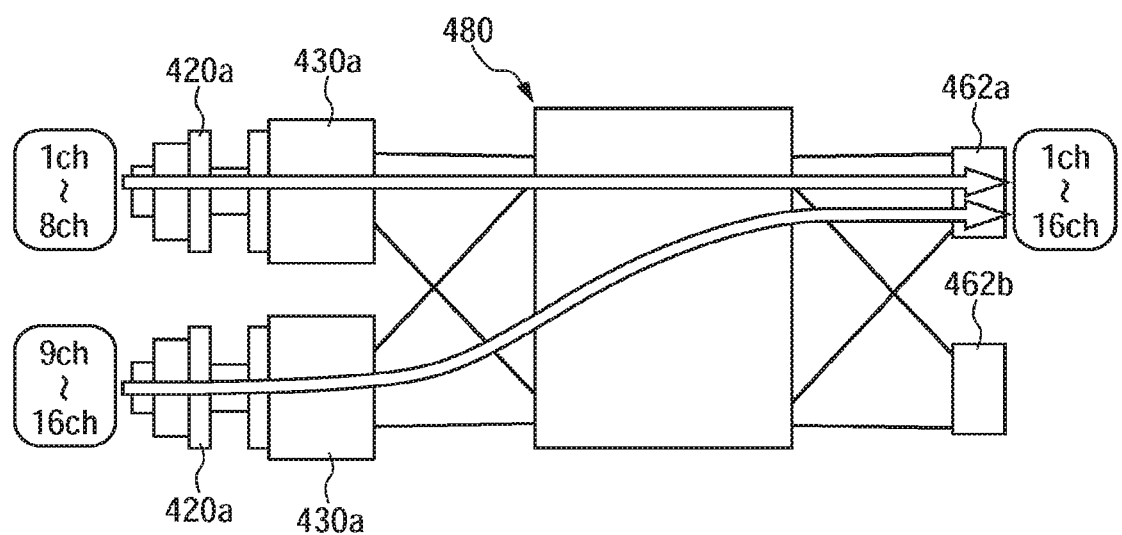
FIG. 13B is a view illustrating a switching operation by the switch device in one embodiment of the present invention.

FIG. 13B is a view illustrating a switching operation of the extension switch portion 480 in the case where the number of paths is 16. Routes corresponding to the respective paths are respectively referred to as 1 to 16 ch for the sake of convenience. Here, description is given of the Drop operation. In the Add operation, directions of input and output are opposite. First, optical signals of 1 to 8 ch out of the 16 paths are inputted to the first splitter portion 420*a*, and optical signals of 9 to 16 ch are inputted to the second splitter portion 420*b*. Then, the first switch portion 430*a* and the second switch portion 430*b* perform route selection. Thereafter, the optical signals are transmitted through the extension switch portion 480. In this case, when the optical signals of 1 to 8 ch are transmitted through the extension switch portion 480, no heating of the heaters 485 is performed so that the optical signals inputted to the first ports 482a can be outputted only to the second ports 483a on the same side. Meanwhile, when the optical signals of 9 to 16 ch are transmitted through the extension switch portion 480, the heating of the heaters 485 is performed so that the optical signals inputted to the first ports 482b can be outputted only to the second ports 483a on the opposite side. As a result, the optical signals of 1 to 8 ch from the first switch portion 430a and the optical signals of 9 to 16 ch from the second switch portion 430b are all outputted to the first client-side port 462a, and the second client-side port 462b is set as an unused port.

Figure 14A:
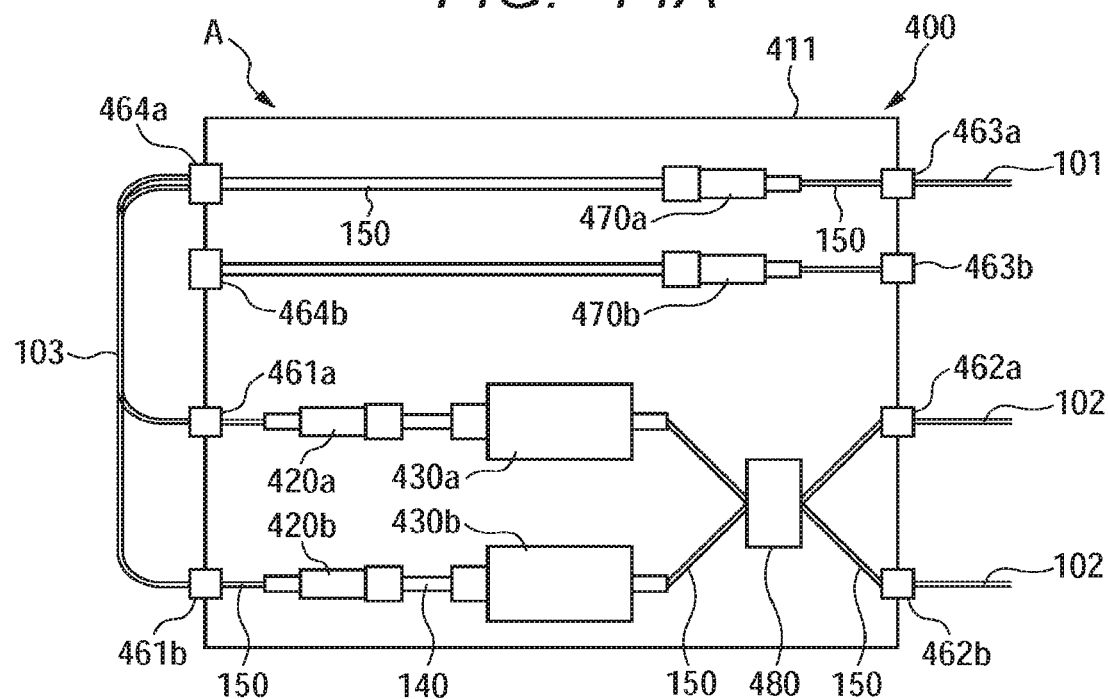
FIG. 14A is a view illustrating a connection state of the switch device in one embodiment of the present invention.

In the switch device 400, the number of processable paths can be easily changed by changing the number of extension units B and the connection state of the optical fibers to the path-side ports 461a, 461b, the client-side ports 462a, 462b, the path-side extension ports 463a, 463b, and the client-side extension ports 464a, 464b. FIG. 14A is a view illustrating a connection state in the case where the switch device 400 is used with the number of paths being 8 and the number of wavelengths being 16. In this case, only the base unit A is used and no extension unit B is used. In the state of FIG. 14A, path-side optical fibers 101 (eight fibers) connected to a ROADM network are connected to the path-side extension port 463a of the extension splitter portion 470a. Extension optical fibers 103 (16 fibers) are connected such that eight extension optical fibers 103 are connected between the client-side extension port 464a of the extension splitter portion 470a and each of the path-side ports 461a, 461b (total of two ports) on the base housing 411. Client-side optical fibers 102 (16 fibers) connected to client devices are connected such that eight client-side optical fibers 102 are connected to each of the client-side ports 462a, 462b (total of two ports) on the base housing 411. The extension switch portion 480 is controlled to perform the switching operation in the case where the number of paths is 8 as in FIG. 13A described above. Connecting the optical fibers 101, 102, 103 as described above causes one set of the splitter portions 420a, 420b, the switch portions 430a, 430b, and the extension switch portion 480 to operate. Accordingly, the switch device 400 can perform the Drop operation or the ADD operation with the number of paths being 8 and the number of wavelengths being 16.

Figure 14B:
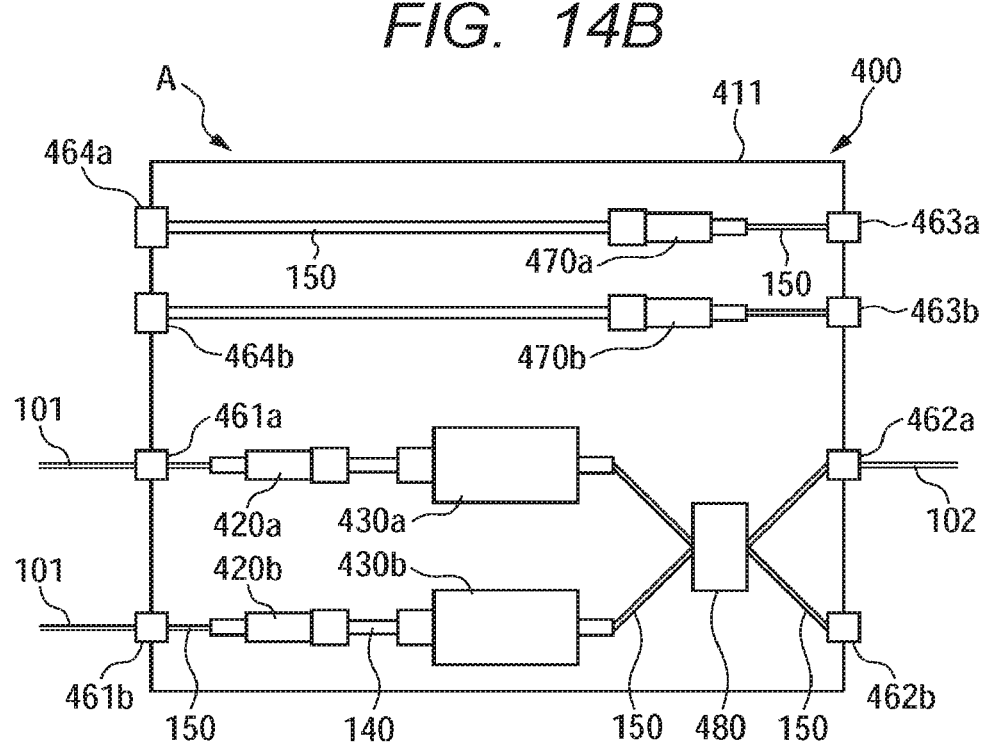
FIG. 14B is a view illustrating a connection state of the switch device in one embodiment of the present invention.

FIG. 14B is a view illustrating a connection state in the case where the switch device 400 is used with the number of paths being 16 and the number of wavelengths being 8. In the state of FIG. 14B, the path-side optical fibers 101 (16 fibers) connected to the ROADM network are connected such that eight path-side optical fibers 101 are connected to each of the path-side ports 461a, 461b (total of two ports) on the base housing 411. The client-side optical fibers 102 (eight fibers) connected to the client devices are connected to the client-side port 462a on the base housing 411. The extension switch portion 480 is controlled to perform the switching operation in the case where the number of paths is 16 as in FIG. 13B described above. Connecting the optical fibers 101, 102 as described above causes one set of the splitter portions 420a, 420b, the switch portions 430a, 430b, and the extension switch portion 480 to operate. Accordingly, the switch device 400 can perform the Drop operation or the ADD operation with the number of paths being 16 and the number of wavelengths being 8.

Moreover, the switch device 400 in which the number of paths is 8 and the number of wavelengths is 8 may have a dual configuration (i.e. a configuration having the Drop function and the Add function) in the following way: the client-side optical fibers 102 are connected to both of the client-side ports 462a, 462b in the state of FIG. 14B, and the extension switch portion 480 is controlled to perform the switching operation in the case where the number of paths is 8 as in FIG. 13A described above.

Figure 15:
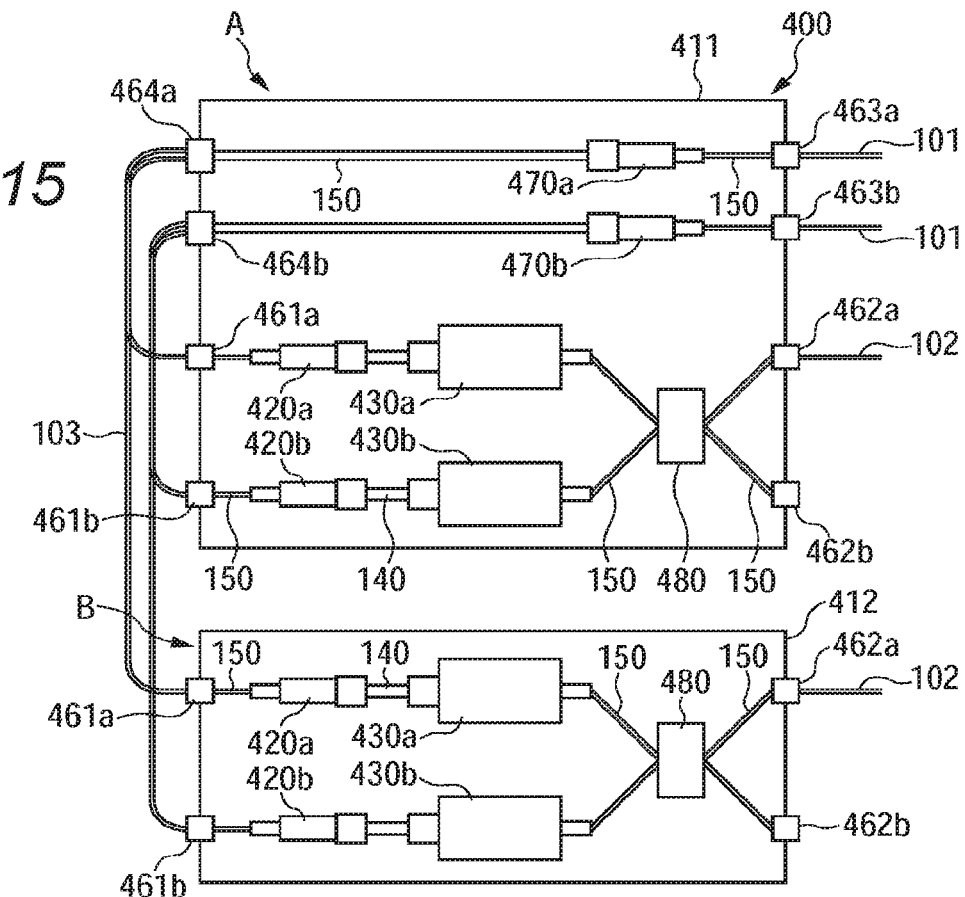
FIG. 15 is a view illustrating a connection state of the switch device in one embodiment of the present invention.

FIG. 15 is a view illustrating a connection state in the case where the switch device 400 is used with the number of paths being 16 and the number of wavelengths being 16. In this case, the base unit A and one extension unit B is used. In the state of FIG. 15, the path-side optical fibers 101 (16 fibers) connected to the ROADM network are connected such that eight path-side optical fibers 101 are connected to each of the path-side extension ports 463a, 463b of the extension splitter portions 470a, 470b. The extension optical fibers 103 (32 fibers) are connected such that eight extension optical fibers 103 are connected between the client-side extension port 464a of the extension splitter portion 470a and each of the path-side ports 461a (total of two ports) on the base housing 411 and the extension housing 412 and between the client-side extension port 464b of the extension splitter portion 470b and each of the path-side ports 461b (total of two ports) on the base housing 411 and the extension housing 412. The client-side optical fibers 102 (16 fibers) connected to the client devices are connected such that eight client-side optical fibers 102 are connected to each of the client-side ports 462a (total of two ports) on the base housing 411 and the extension housing 412. The extension switch portion 480 is controlled to perform the switching operation in the case where the number of paths is 16 as in FIG. 13B described above. Connecting the optical fibers 101, 102, 103 as described above causes two sets of the splitter portions 420a, 420b, the switch portions 430a, 430b, and the extension switch portion 480 to operate. Accordingly, the switch device 400 can perform the Drop operation or the ADD operation with the number of paths being 16 and the number of wavelengths being 16.

In the switch device 400 in the embodiment, the number of wavelengths and the number of paths can be easily changed only by changing the connection portions of the optical fibers. Moreover, since the switch device 400 in the embodiment includes the base unit and the extension unit which are provided in the separate housings, the number of extension units (i.e. the number of housings) can be increased or reduced depending on the number of required wavelengths. Accordingly, the manufacturing cost and installation space of the switch device 400 can be suppressed to a minimum, and the extension units can be shared with other switch devices 400.

In the embodiment, the switch device 400 in which the number of wavelengths is selectable from 8 or 16 and the number of paths is selectable from 8 or 16 is given as an example. However, the numbers in the present invention are not limited to these specific numbers, and the present invention can be applied to any number of paths and any number of wavelengths. The number of branches and the number of chips in each of the splitter portions 420a, 420b, the switch portions 430a, 430b, the extension switch portions 480, and the extension splitter portions 470a, 470b can be set to any numbers depending on the target number of paths and the target number of wavelengths.

The switch device 400 can be configured such that the number of wavelengths is selectable from one of 8, 16, 24, and 32 as in the first embodiment, by providing a 1×3 extension splitter portion and a 1×4 extension splitter portion in the base housing 411 as in the first embodiment.

Fifth Embodiment

In the fourth embodiment, the switch portions 430a, 430b and the extension switch portion 480 are provided on the separate chips, and the chips are connected to one another by the multiple optical fibers 150. Meanwhile, in the embodiment, each of switch portions 430a, 430b and an extension switch portion 480 are provided on the same chip.

Figure 16:
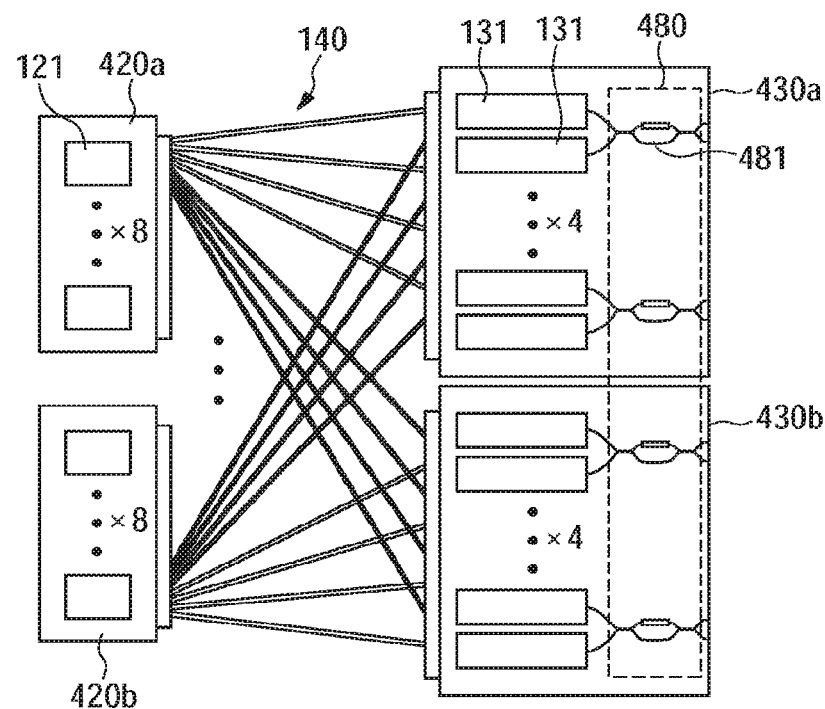
FIG. 16 is a schematic view of a switch device in one embodiment of the present invention.

FIG. 16 is a schematic view of splitter portions 420a, 420b, the switch portions 430a, 430b, and the extension switch portion 480. A configuration other than a chip configuration of the switch portions 430a, 430b and the extension switch portion 480 and wiring of a shuffle fiber array 140 is the same as that in the fourth embodiment.

The following points are different from the fourth embodiment. Four out of eight MZIs 481 included in the extension switch portion 480 are provided on a chip of the first switch portion 430a, and the other four MZIs 481 are provided on a chip of the second switch portion 430b. Two first ports of each of the MZIs 481 are connected to two optical switches 131 adjacent to each other, via waveguides. Specifically, each of the first switch portion 430a and the second switch portion 430b includes four sets of configurations in each of which the two optical switches 131 and one MZI 481 are connected to one another via the waveguides.

The shuffle fiber array 140 connects one of the two optical switches 131 connected to each MZI 481 to the optical splitter 121 included in the first splitter portion 420a, and connects the other optical switch 131 to the optical splitter 121 included in the second splitter portion 420b. To put it the other way around, the shuffle fiber array 140 connects four out of eight branch ports of each of the optical splitters 121 included in the splitter portions 420a, 420b to the optical switches 131 included in the first switch portion 430a, and connects the other four branch ports to the optical switches 131 included in the second switch portion 430b.

In the fourth embodiment, rearranging of the channels is performed between the switch portions 430a, 430b and the extension switch portion 480. Accordingly, when each of the switch portions 430a, 430b and the extension switch portion 480 are to be connected on the same chip via waveguides, the waveguides intersect one another and intersection loss occurs. Meanwhile, in the embodiment, rearranging of channels is performed between the splitter portions 420a, 420b and the switch portions 430a, 430b. Accordingly, no intersection loss occurs when each of the switch portions 430a, 430b and the extension switch portion 480 are connected on the same chip via the waveguides. Providing each of the switch portions 430a, 430b and the extension switch portion 480 on the same chip can reduce the number of times of connecting the optical fibers which requires a lot of labor, and reduce the manufacturing cost. Moreover, in the embodiment, the numbers of wavelengths and paths can be easily changed as in the fourth embodiment.

Sixth Embodiment

In the switch devices in the first to third embodiments, the path-side optical fibers 101 need to be rearranged depending on the number of wavelengths. Meanwhile, in the embodiment, rearranging of path-side optical fibers 101 is unnecessary when the number of wavelengths is changed.

Figure 17:
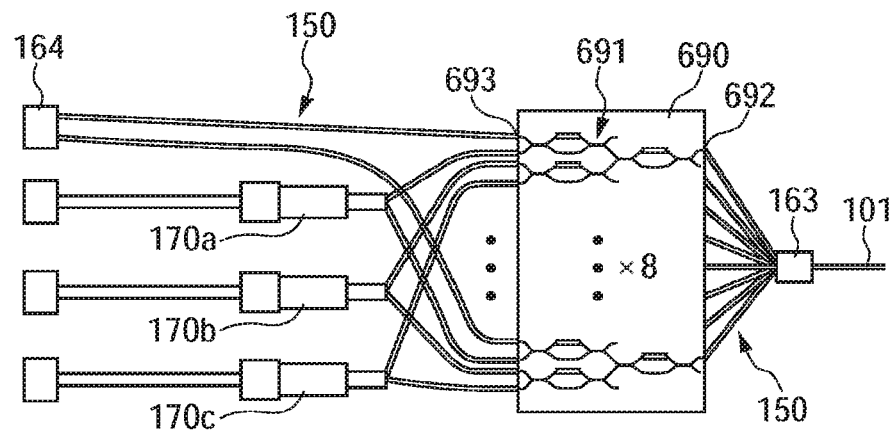
FIG. 17 is a schematic view of a switch device in one embodiment of the present invention.
Figure 18:
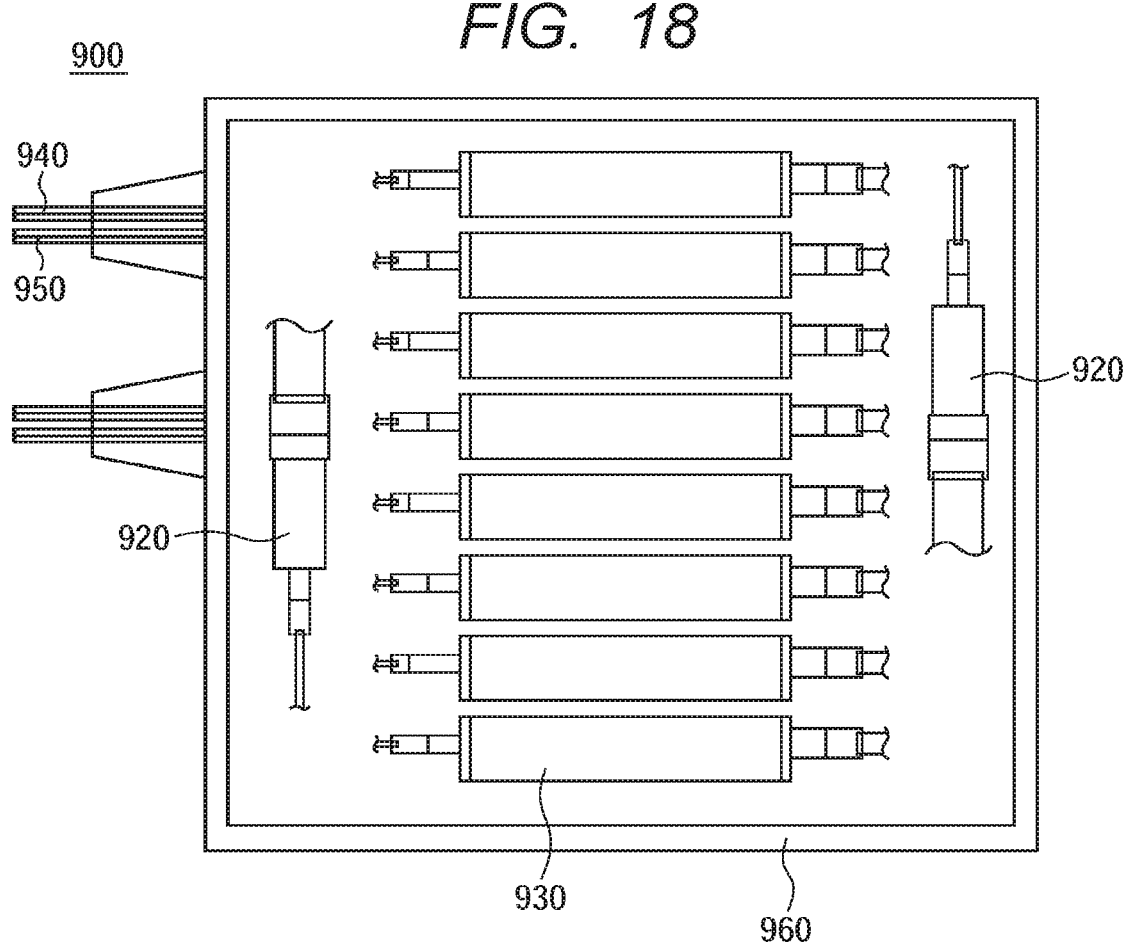
FIG. 18 is a top view of a conventional switch device.

FIG. 17 is a schematic view of a connection selection portion 690 and extension splitter portions 170a, 170b, 170c. A configuration other than portions related to the connection selection portion 690 is the same as that in the first embodiment.

The embodiment is different from the first embodiment in that only one path-side extension port 163 is provided and the connection selection portion 690 for connecting the path-side extension port 163 and the extension splitter portions 170a, 170b, 170c (or a client-side extension port 164) is additionally provided.

The connection selection portion 690 includes eight optical switches 691 on one chip (substrate). Each of the optical switches 691 is a 1×4 optical switch which is controlled by a not-illustrated control unit to enable selection of a route of an optical signal, and has one common port 692 at one end and four branch ports 693 at another end. A configuration in which each optical switch 691 includes multiple MZIs connected in multiple stages can be given as an exemplary configuration. In this configuration, the control unit drives a heater provided for each MZI to change the branch ratio of the MZI, and a route of an optical signal transmitted through the optical switch 691 can be thereby selected.

The common port 692 of each of the optical switches 691 included in the connection selection portion 690 is connected to the path-side extension port 163 via an optical fiber 150. The four branch ports 693 of each of the optical switches 691 included in the connection selection portion 690 are connected respectively to the client-side extension port 164 and the extension splitter portions 170a, 170b, 170c via optical fibers 150.

A switching operation by the connection selection portion 690 is described. Here, description is given of the Drop operation. In the Add operation, directions of input and output are opposite. Note that the client-side extension port 164 and a path-side port 161 are assumed to be connected via extension optical fibers 103 in such a way as to correspond to the target number of wavelengths as in the first embodiment. When the switch device 100 is used with the number of paths being 8 and the number of wavelengths being 8, the route selection is performed such that the connection selection portion 690 directly outputs an eight-channel optical signal inputted from the path-side extension port 163, to the client-side extension port 164. When the switch device 100 is used with the number of paths being 8 and the number of wavelengths being 16, the route selection is performed such that the connection selection portion 690 outputs the eight-channel optical signal inputted from the path-side extension port 163, to the extension splitter portion 170a. When the switch device 100 is used with the number of paths being 8 and the number of wavelengths being 24, the route selection is performed such that the connection selection portion 690 outputs the eight-channel optical signal inputted from the path-side extension port 163, to the extension splitter portion 170b. When the switch device 100 is used with the number of paths being 8 and the number of wavelengths being 32, the route selection is performed such that the connection selection portion 690 outputs the eight-channel optical signal inputted from the path-side extension port 163, to the extension splitter portion 170c.

In the embodiment, the number of wavelengths can be changed in a configuration using one path-side extension port 163. Accordingly, rearranging of the path-side optical fibers 101 is unnecessary when the number of wavelengths is changed. Accordingly, the number of wavelengths can be changed more easily than in the first embodiment. The embodiment can be used in combination with any of the second to fifth embodiments.

The present invention is not limited to the embodiments described above and can be changed as appropriate within a range not departing from the spirit of the present invention.

The invention claimed is:

1. A switch device for an optical signal, comprising:
a housing;
first and second splitter portions which are provided in the housing and which each include a plurality of optical splitters each having a common port and a plurality of branch ports and configured to perform division and merging of the optical signal between the common port and the plurality of branch ports;
first and second switch portions which are provided in the housing and which each include a plurality of optical switches each having a common port and a plurality of branch ports and configured to perform route selection of the optical signal between the plurality of branch ports and the common port; and
an extension splitter portion which is provided in the housing and which includes a plurality of optical splitters each having a common port and a plurality of branch ports and configured to perform division and merging of the optical signal between the common port and the plurality of branch ports, wherein
the plurality of branch ports of the first splitter portion are connected to the plurality of branch ports of the first switch portion, and the plurality of branch ports of the second splitter portion are connected to the plurality of branch ports of the second switch portion, and
the plurality of branch ports of the extension splitter portion and the common ports of the first and second splitter portions are connectable to each other outside the housing.

2. The switch device according to claim 1, wherein the switch device is switchable between:
a first state in which optical fibers from an outside of the switch device are connected to the common ports of the first switch portion and optical fibers from an outside of the switch device are connected to the common ports of the first splitter portion connected to the first switch portion; and
a second state in which optical fibers from an outside of the switch device are connected to the common ports of the extension splitter portion, optical fibers are connected outside the housing between the plurality of branch ports of the extension splitter portion and the common ports of the first and second splitter portions, and optical fibers from an outside of the switch device are connected to the common ports of the first and second switch portions.

3. The switch device according to claim 1, further comprising an extension switch portion which is provided in the housing and which includes a plurality of optical switches each having two first ports and two second ports and configured to perform route selection of the optical signal between the two first ports and the two second ports, wherein
two of the extension splitter portions are provided in the housing, and
one of the two first ports of the extension switch portion is connected to one of the common ports of the first switch portion, and another one of the two first ports of the extension switch portion is connected to one of the common ports of the second switch portion.

4. The switch device according to claim 3, wherein the switch device is switchable between:
a first state in which optical fibers from an outside of the switch device are connected to the common ports of one of the two extension splitter portions, optical fibers are connected outside the housing between the plurality of branch ports of the one extension splitter portion and the common ports of the first and second splitter portions, and optical fibers from an outside of the switch device are connected to the two second ports of the extension switch portion; and
a second state in which optical fibers from an outside of the switch device are connected to the common ports of the first and second splitter portions and an optical fiber from an outside of the switch device is connected to one of the two second ports of the extension switch portion.

5. A switch device for an optical signal comprising:
first and second housings;
a first splitter portion which is provided in the first housing and which includes a plurality of optical splitters each having a common port and a plurality of branch ports and configured to perform division and merging of the optical signal between the common port and the plurality of branch ports;
a first switch portion which is provided in the first housing and which includes a plurality of optical switches each having a common port and a plurality of branch ports and configured to perform route selection of the optical signal between the plurality of branch ports and the common port;
an extension splitter portion which is provided in the first housing and which includes a plurality of optical splitters each having a common port and a plurality of branch ports and configured to perform division and merging of the optical signal between the common port and the plurality of branch ports;
a second splitter portion which is provided in the second housing and which includes a plurality of optical splitters each having a common port and a plurality of branch ports and configured to perform division and merging of the optical signal between the common port and the plurality of branch ports;
a second switch portion which is provided in the second housing and which includes a plurality of optical switches each having a common port and a plurality of branch ports and configured to perform route selection of the optical signal between the plurality of branch ports and the common port, wherein
the plurality of branch ports of the first splitter portion are connected to the plurality of branch ports of the first switch portion, and the plurality of branch ports of the second splitter portion are connected to the plurality of branch ports of the second switch portion, and
the plurality of branch ports of the extension splitter portion and the common ports of the first and second splitter portions are connectable to each other outside the first and second housings.

6. The switch device according to claim 5, wherein the switch device is switchable between:
a first state in which optical fibers from an outside of the switch device are connected to the common ports of the first switch portion and optical fibers from an outside of the switch device are connected to the common ports of the first splitter portion connected to the first switch portion; and
a second state in which optical fibers from an outside of the switch device are connected to the common ports of the extension splitter portion, optical fibers are connected outside the first and second housing between the plurality of branch ports of the extension splitter portion and the common ports of the first and second splitter portions, and optical fibers from an outside of the switch device are connected to the common ports of the first and second switch portions.

7. The switch device according to claim 5, further comprising:
   a first extension switch portion which is provided in the first housing and which includes a plurality of optical switches each having two first ports and two second ports and configured to perform route selection of the optical signal between the two first ports and the two second ports;
   a second extension switch portion which is provided in the second housing and which includes a plurality of optical switches each having two first ports and two second ports and configured to perform route selection of the optical signal between the two first ports and the two second ports, wherein
   two of the extension splitter portions are provided in the first housing,
   two of the first splitter portions and two of the first switch portions are provided in the first housing,
   two of the second splitter portions and two of the second switch portions are provided in the second housing,
   one of the two first ports of the first extension switch portion is connected to the common port of one of the two first switch portions, and another one of the two first ports of the first extension switch portion is connected to the common port of another one of the two first switch portions, and
   one of the two first ports of the second extension switch portion is connected to the common port of one of the two second switch portions, and another one of the two first ports of the second extension switch portion is connected to the common port of another one of the two second switch portions.

8. The switch device according to claim 7, wherein the switch device is switchable between:
   a first state in which optical fibers from an outside of the switch device are connected to the common ports of one of the two extension splitter portions, optical fibers are connected outside the housings between the plurality of branch ports of the one extension splitter portion and the common ports of the two first splitter portions, and optical fibers from an outside of the switch device are connected to the two second ports of the first extension switch portion; and
   a second state in which optical fibers from an outside of the switch device are connected to the common ports of the two extension splitter portions, optical fibers are connected outside the housings between the plurality of branch ports of one of the two extension splitter portions and the common ports of one of the two first splitter portions and one of the second splitter portions, optical fibers are connected outside the housings between the plurality of branch ports of another one of the two extension splitter portions and the common ports of another one of the two first splitter portions and another one of the two second splitter portions, and optical fibers from an outside of the switch device are connected to one of the two second ports of the first extension switch portion and one of the two second ports of the second extension switch portion.

* * * * *